US010148686B2

(12) United States Patent
Hassanzadeh et al.

(10) Patent No.: US 10,148,686 B2
(45) Date of Patent: Dec. 4, 2018

(54) TELEMETRY ANALYSIS SYSTEM FOR PHYSICAL PROCESS ANOMALY DETECTION

(71) Applicant: Accenture Global Solutions Limited, Dublin (IE)

(72) Inventors: Amin Hassanzadeh, Arlington, VA (US); Shaan Mulchandani, Arlington, VA (US); Malek Ben Salem, Falls Church, VA (US); Chien An Chen, Fairfax, VA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/429,900

(22) Filed: Feb. 10, 2017

(65) Prior Publication Data
US 2017/0230410 A1   Aug. 10, 2017

Related U.S. Application Data

(60) Provisional application No. 62/293,623, filed on Feb. 10, 2016.

(51) Int. Cl.
*H04L 29/06* (2006.01)
*G06N 99/00* (2010.01)

(52) U.S. Cl.
CPC ....... *H04L 63/1441* (2013.01); *G06N 99/005* (2013.01); *H04L 63/1416* (2013.01)

(58) Field of Classification Search
CPC . H04L 43/16; H04L 63/1416; H04L 41/0631; H04L 63/1441
See application file for complete search history.

(56) References Cited

U.S. PATENT DOCUMENTS

| | | | | |
|---|---|---|---|---|
| 7,386,417 B1 * | 6/2008 | Bao | ..................... | G06F 11/0724 375/343 |
| 8,654,655 B2 * | 2/2014 | Silveira Filho | ..... | H04L 63/1416 370/242 |
| 9,032,522 B1 * | 5/2015 | Mulder | ................. | G06F 21/552 726/23 |
| 2005/0198034 A1 * | 9/2005 | Boyer | ............... | G05B 19/4183 |

(Continued)

OTHER PUBLICATIONS

Kleinmann et al., "Accurate Modeling of the Siemens S7 Scada Protocol for Intrusion Detection and Digital Forensics1," Tel-Aviv University, 2014 ADFSL, 14 pages.

(Continued)

*Primary Examiner* — Christopher C Harris
(74) *Attorney, Agent, or Firm* — Fish & Richardson P.C.

(57) ABSTRACT

Systems, methods, and apparatus, including computer programs encoded on computer storage media, for analyzing telemetry data from physical process sensors to detect anomalies within the physical process. A telemetry analytics system is disclosed as a process level anomaly detection system based on operational telemetrics and domain-specific knowledge that protects cyber physical system (CPS) devices against zero-day exploits not detectable through traditional system log or network packet inspection. The telemetry analytics system operates as a security component comparable to intrusion detection or anti-virus/anti-malware that generates alerts upon detecting anomalies in the sensor and/or activity data ingested from system or network data sources.

13 Claims, 4 Drawing Sheets

(56) References Cited

U.S. PATENT DOCUMENTS

| | | | | |
|---|---|---|---|---|
| 2006/0294579 | A1* | 12/2006 | Khuti | H04L 63/02 726/3 |
| 2007/0028219 | A1* | 2/2007 | Miller | G05B 23/021 717/124 |
| 2008/0252441 | A1* | 10/2008 | McElfresh | G08B 29/06 340/507 |
| 2010/0229023 | A1 | 9/2010 | Gross et al. | |
| 2011/0288692 | A1* | 11/2011 | Scott | G06F 21/55 700/297 |
| 2013/0031037 | A1* | 1/2013 | Brandt | H04L 63/1408 706/12 |
| 2013/0198119 | A1* | 8/2013 | Eberhardt, III | G06N 99/005 706/12 |
| 2013/0211559 | A1* | 8/2013 | Lawson | G06Q 10/06315 700/83 |
| 2014/0152465 | A1* | 6/2014 | Armon | G05B 23/024 340/870.02 |
| 2014/0222379 | A1* | 8/2014 | Martinez Heras | G05B 23/024 702/188 |
| 2014/0372348 | A1* | 12/2014 | Lehmann | G06K 9/6265 706/12 |
| 2016/0065603 | A1* | 3/2016 | Dekel | H04L 63/1425 726/23 |
| 2016/0094578 | A1* | 3/2016 | McQuillan | H04L 63/1433 726/23 |
| 2017/0054751 | A1* | 2/2017 | Schneider | H04L 63/1425 |
| 2017/0359361 | A1* | 12/2017 | Modani | H04L 63/1425 |

OTHER PUBLICATIONS

Yairi et al., "Spacecraft Telemetry Data Monitoring by Dimensionality Reduction Techniques," The Grand Hotel, Aug. 18-21, 2010, 5 pages.

Hadkžosmanovic et al., "Through the Eye of the PLC: Semantic Security Monitoring for Industrial Processes," ACSAC '14 Dec. 8-12, 2014, 10 pages.

Urbina et al., "Limiting the Impact of Stealthy Attacks on Industrial Control Systems," CCS'16, Oct. 24-28, 2016, 14 pages.

Nivethan et al., "A SCADA Intrusion Detection Framework that Incorporates Process Semantics," CISRC '16, Apr. 5-7, 2016, 5 pages.

European Extended Search Report for Application No. 17155642.6, dated Jun. 14, 2017, 9 pages.

Kavulya et al., "Failure Diagnosis of Complex Systems," Carnegie Mellon University, Jun. 28, 2012, 28 pages.

Boggs et al., "Cross-Domain Collaborative Anomaly Detection: So Far Yet So Close," Department of Computer Science, Sep. 20, 2011, 20 pages.

Australian Office Action for Application No. 2017200941, dated Sep. 22, 2017, 3 pages.

Australian Office Action for Application No. 2017200941, dated Jan. 30, 2018, 2 pages.

European Office Action in European Application No. 17155642.6, dated Mar. 20, 2018, 4 pages.

Notice of Acceptance for Patent Application No. 2017200941, dated Mar. 5, 2018, 3 pages.

* cited by examiner

TELEMETRY ANALYSIS SYSTEM FOR PHYSICAL PROCESS ANOMALY DETECTION

CROSS-REFERENCE TO RELATED APPLICATION

This application claims benefit of U.S. Provisional Patent Application No. 62/293,623, filed Feb. 10, 2016, and titled "TELEMETRY ANALYSIS SYSTEM FOR PHYSICAL PROCESS ANOMALY DETECTION," which is hereby incorporated by reference in its entirety.

BACKGROUND

The present disclosure relates to security and network operations. The Industrial Internet, enabled by sensor-driven computing, industrial analytics and intelligent machine applications, is increasing the attack surface for several domains, including Industrial Control Systems (ICS). This has led to new attack vectors that can leverage the IT domain to get a foothold and manipulate the operations technology (OT) infrastructure. Extremely sophisticated attacks, such as STUXNET, Night Dragon and the BlackEnergy campaign, have shown the extent to which cybersecurity events can wreak havoc in the physical world. Numerous security solutions in both enterprise/IT and OT domains exist, however solutions effective in one domain may not always apply to the other due to the unique characteristics of each domain. An enhanced multi-domain situational awareness mechanism for advanced threat detection and identification becomes essential.

SUMMARY

In general, one innovative aspect of the subject matter described in this specification can be embodied in an integrated enhanced situational awareness and advanced threat detection and identification system to address several technical challenges to rapid attack detection, isolation and characterization. The threat detection and identification system described in greater detail herein is also referred to as ESTATION.

A first technical challenge in enhancing situational awareness, for example in power grid networks, is to understand how each security control operates in a power grid environment, identify which security controls are effective for power grid security, and determine the optimal location to deploy them in order to maximize security effectiveness and efficiency.

Numerous security frameworks in both enterprise/IT and OT domains exist (e.g., SANS Critical Security Controls and NIST ICS Cybersecurity framework), however solutions effective in one domain may not always apply to the other due to the unique characteristics of each domain. In order to enhance the situational awareness in such a heterogeneous environment, it is paramount to strategically place security components throughout the entire network so that an optimal amount of security data (e.g. maximum entropy, minimum false alert) is provided for the event management module. Due to inherent differences in security requirements and operational priorities in enterprise and ICS infrastructures, and also different architectural models in ICS networks, it becomes important to determine how security controls (e.g., firewall, IDS/IPS, Antivirus and Antimalware, device authorization and counterfeit detection) are deployed to address risks and effectively detect security anomalies at their early stages.

One component of the overall ESTATION system is a system that assists with assignment of security controls. An exemplary system described herein as an Effective and efficient Security Controls AssigNment (ESCAN) framework is disclosed, and is configured to measure the effectiveness and efficiency of security controls for power grid architectures. The tool allows computer and network security architects to determine which, where, and how security controls should be deployed in a given architecture. The ESCAN tool is an ICS security assessment tool used to simulate industrial incidents for a given ICS architecture. The tool generates a list of the most effective security controls and their most effective deployment location in multi-level ICS architectures in order to minimize detection latency, as early warning of only a few minutes may be sufficient to protect, for example, critical electrical grid equipment, or other systems and components within an ICS architecture.

A second challenge to securing ICS networks, in general, lies in the reliance on logs/alerts from security appliances (e.g., IDS/IPS, firewall, DMZ servers, historian servers) only for security monitoring. These security tools inspect network traffic and system activities for anomalous behaviors and lack visibility into process-level attacks. To overcome this limitation, an exemplary implementation of the system uses operational telemetrics—which are currently collected through periodical probing in OT environments and used to detect human errors and/or system faults—for improving security insight. Through use of this system, zero-day process attacks can be detected by analyzing telemetry data when incorporated with domain-specific context. As will be described in greater detail below, a telemetry analytics system is disclosed that implements telemetry data analysis for physical process anomaly detection. The system implements process semantics as the domain knowledge and machine learning techniques to detect and identify cybersecurity anomalies. The telemetry analytics system described in greater detail herein is also referred to as SINOPTEC.

As part of the exemplary implementation, the ESTATION system includes and integrates the disclosed ESCAN and SINOPTEC components. It also includes and integrates a third component that operates as an event management system (also referred to as an event correlation system). A preferred event management system is disclosed in more detail herein, and is referred to as a system called ECHO (Event Correlation across Heterogeneous Operations). As disclosed, the event management system, or ECHO system, is a platform for event analysis and management, that operates to detect complex threat vectors within connected and heterogeneous industrial infrastructure through a multi-domain event/alert correlation engine. The primary objective of ECHO is to detect malicious activity that traverses from the IT domain (enterprise network) to the OT domain (control zones) and vice versa. The ECHO system is operable to detect temporally distributed, multistep and multi-session attacks in heterogeneous environments, and can additionally incorporate threat intelligence information to enrich the detection mechanism. Systems operating in a single domain may correlate events/alerts and detect compromises; however, the full extent of such detected compromises may not be known as potentially related threat activity from other domains not considered. Alternatively, correlation of activities within a single domain may not yield any results or insights. Data correlation across IT and OT domains based on events informed by various security components, not only offers the advantages of traditional event correlation (e.g., SIEM), but also serves in detecting complex attacks, such as the temporally distributed, multi-step and/or multi-session attacks. It provides a single vantage point to security administrators. ECHO, upon receiving unified security logs/alerts from both the IT and OT domains, verifies and filters them for relevance, and then performs alert fusion, aggregation and correlation based on graph database models to construct complex attack patterns. ECHO also provides a summary of successful and failed attacks and courses of actions associated with each of them.

Another technical challenge to address when dealing with event correlation is the high false positive rates and the attack detection latency. Security assets and logging systems are often configured with static rules for alert generation, and may be misconfigured, sporadically updated, or set to flag very broadly classified activity. As such, they often produce a large amount of alerts, many of which are false positives. Correlation of such events proves to be difficult due to volume, velocity, and variety. Implicit (as opposed to explicit) correlation is often utilized, however this proves to be ineffective in providing adequate forensic evidence, attributions to specific actors, and extraction of rules via fuzzy matching. ECHO addresses this problem by utilizing a scalable, dynamic graph infrastructure allowing for both implicit and explicit correlation, fuzzy matching for abstraction of 'classes' of anomalous events that transcend atomic alerts. This enables security analysts and/or system operators to provide feedback that is integrated with the learning components to further reduce false positives. ECHO's correlation mechanism utilizes a model manager to run numerous graph traversal and correlation algorithms in order to detect anomalous activity chains corresponding to potential sophisticated attacks, and further identify, classify, and prioritize those in the presence of publicly available threat intelligence that are leveraged.

The successful testing and validation of a situational awareness system within the energy industry is contingent upon the availability of large volumes of domain data. Numerous algorithms, methodologies, or solutions are proposed but often fail to address the diverse complexities within grid environments (i.e. scale and heterogeneity of edge devices, ability to support and/or obtain telemetry or security data from legacy devices, inability to process and implement various analytical models on streaming data). ESTATION leverages a digital integrated platform that comprises a connected platform to support data ingestion from IoT (Internet of Things) environments, and an insights platform built using Lambda Architecture and backed by the Accenture Cloud Platform.

An innovative aspect of the subject matter described in this specification may be implemented in a security system for detecting a security anomaly associated with a physical process within an industrial control system (ICS). The system includes an industrial control network having a plurality of endpoint devices, and at least one programmable logic controller that communicates with the endpoint devices through the industrial control network. The endpoint devices produce telemetry data and transmit the telemetry data on the industrial control network. A telemetry analytics engine is configured to receive the telemetry data from the endpoint devices, and is configured to receive reference data from the at least one programmable logic controller. The telemetry analytics engine further includes an anomaly detection processor configured to analyze the telemetry data to detect anomalies that indicate a potential security compromise, and a root cause analysis processor configured to execute a correlation process between security data received from external sources, and data that is output from the anomaly detection processor. The telemetry analytics engine identifies the root cause of the potential security compromise with respect to the industrial control system and provides a security alert to a human machine interface (HMI).

These and other implementations can each optionally include one or more of the following features. The endpoint devices may be one or more sensors that monitor the physical process. The system may include an event correlation system that receives the security alert from the telemetry analytics engine. The telemetry analytics engine may be configured to cluster the telemetry data into logical endpoint device groupings that represent sub networks of the industrial control network. The anomaly detection processor of the system may execute a model based anomaly detection process to identify anomalies in the telemetry data. Domain specific knowledge may be provided as an input to the model based anomaly detection process. The anomaly detection processor of the system may execute a data driven anomaly detection process to identify anomalies in the telemetry data. Physical process semantics data may be provided as an input to the data driven anomaly detection process. The data driven anomaly detection process may further include execution of machine learning processes to identify anomalies in the telemetry data. As part of the system, the correlation process executed by the root cause analysis engine may determine whether the root cause of the anomaly is one of a cyber-attack, a human error, a process failure or a system fault.

Other embodiments of this aspect include corresponding computer methods, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

DETAILED DESCRIPTION

This specification describes systems, methods, and computer programs for performing analysis of telemetry data for physical process anomaly detection.

Figure 1:
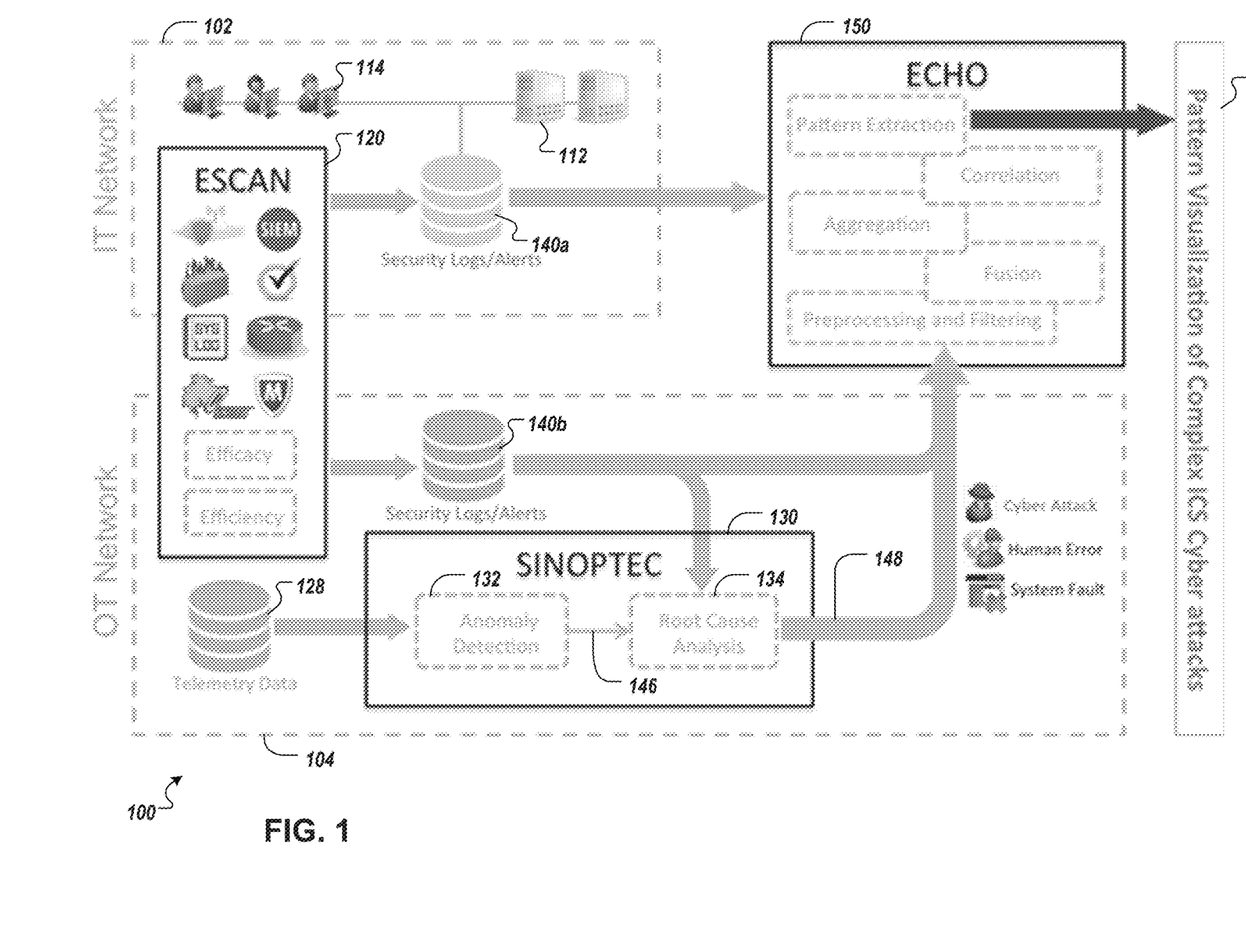
FIG. 1 is a diagram showing the components of an integrated threat detection and identification system.

FIG. 1 depicts an example threat detection and identification system 100 that can execute implementations of the present disclosure. The threat detection and identification system 100 is an integrated situational awareness and advanced threat detection and identification system that operates multiple processing engines that execute the processes of rapid attack detection, isolation and characterization. In the present example, the threat detection and identification system 100 monitors an industrial control system and operates across multiple network domains, including an information technology (IT) network domain 102 (e.g., which may include an enterprise network) and an operational technology (OT) network domain 104. Each of the network domains 102 and 104, for example, may include local and wide area networks (LAN/WAN) and wireless networks, and can be used to integrate various computing devices, such as servers, mainframes, desktops, laptops, tablets, smartphones, and industrial control devices and sensors, that may run on multiple different operating systems and may employ multiple different communication protocols. The threat detection and identification system 100 also may include a security controls assignment system 120, such as the ESCAN system. The security controls assignment system 120 operates within both the network domains 102 and 104. The threat detection and identification system 100 may include a telemetry analytics system 130, such as the SINOPTEC system that operates primarily within the OT network domain 104.

The security controls assignment system 120 is a security architecture assessment tool that simulates the functionality of a various security components and system operability in the presence of famous ICS incidents and proposes an effective and efficient framework for security control assignment in, for example, a given power grid. For example, it is important to know at what location in the architectural levels of an ICS network is the most effective point to deploy protective mechanisms such as firewalls and IPS. Similarly, the security controls assignment system 120 can analyze and identify the most efficient approach for defining VLANs, securing machine-to-machine (M2M) communications, and/or collecting system logs in a specific ICS architecture to lower the negative impact of a cyber-attack, and to reduce the false negative rates.

The information technology network domain 102 can include various computing devices (e.g., computing servers 112), input/output devices (e.g., interface device 114), and/or subsystems. The computing server 112, for example, can include one or more processors configured to execute instructions stored by computer-readable media for performing various operations, such as input/output, communication, data processing, and/or data maintenance. To interact with the computing server, for example, a user can employ the interface device 114 (e.g., including one or more presentation components, such as a display, and one or more input components such as a keyboard, mouse, and/or touchpad).

The operational technology network domain 104 can include various computing devices, input/output devices, and/or subsystems. In the present example, the operational technology network domain 104 may include one or more devices or systems (not specifically shown) such as a supervisory system, a historian server, an application server, one or more human-machine interface (HMI) devices, and one or more controller devices and sensor devices. The supervisory system, for example, can coordinate one or more low-level controls and/or low-level sensors. The supervisory system can provide data to and receive data from the controller device and the sensor device. The historian server, for example, can store, maintain, and provide information related to activities performed by each controller device and sensor data provided by each sensor device in the operational technology network domain 104. The application server, for example, can host applications that may operate within the operational technology network domain 104.

In some implementations, the system 100 may include one or more security sensors (not specifically shown). In general, security sensors included in the system 100 may include network based (NIBS) and host based (HIDS) intrusion detection systems, intrusion prevention systems (IPS), anti-virus systems, firewalls, and other detection/logging services (e.g., web server logs, database logs, etc.) which can monitor communications activity to and from computing devices included in the industrial technology (IT) network domain 102 and the operational technology (OT) network domain 104, and can monitor system activity associated with the devices. Data associated with potentially malicious activity may be detected (and optionally, recorded) by the security sensors (e.g., as event/alert data, log files, etc.), and/or other detection/logging devices included in the system 100, and/or may be provided to other components of the system 100. For example, activity data 140a, 140b (e.g., detected by the corresponding security sensors) may be provided to an event correlation system 150 (e.g., an ECHO system as described in greater detail herein) for further analysis and processing. Such activity data may also be provided to the event correlation system 150 by a Security Information and Event Management (SIEM) system. The activity data 140a, for example, may include enterprise data from the information technology network domain 102, provided by host-based monitoring systems (e.g., intrusion detection/prevention systems, web server logging services, system logs, etc.) and/or network-based monitoring systems (e.g., intrusion detection/prevention systems, firewalls, routers, etc.). The activity data 140b, for example, may include supervisory data, control layer data, and/or sensor and controller device data from the operational technology network domain 104, provided by host-based monitoring systems and/or network-based monitoring systems.

In the present example, each of the activity data 140a, 140b may include event and/or alert data. In general, events are atomic pieces of data associated with communications and system activity, whereas alerts may be triggered in response to an event or a sequence of events. Data provided by the security sensors, for example, may include alert data. Data provided by a host (e.g., the computing server 112), the controller device, the sensor device, or data included in log files, for example, may include event data.

The event correlation system 150 (e.g. an event management system such as the ECHO system) can receive the activity data 140a, 140b from multiple domains (e.g., the information technology (IT) network domain 102, and the operational technology (OT) network domain 104), and can standardize, filter, aggregate, and correlate the data to detect anomalies and potentially malicious activity associated with multi-stage, multi-domain attacks. In the present example, the event correlation system 150 can include various computing devices (e.g., a computing server), input/output devices (e.g., an interface device), and/or subsystems. The computing server, for example, can include one or more processors configured to execute instructions stored by computer-readable media for performing various operations, such as input/output, communication, data processing, and/or data maintenance. To interact with the computing server, for example, a user can employ the interface device (e.g., including one or more presentation components, such as a display, and one or more input components such as a keyboard, mouse, and/or touchpad).

The event correlation system 150 is a multi-domain event management module that correlates security events informed by various security components that are deployed in both IT and OT environments 102, 104. On ingesting activity data 140a, 140b from each network domain 102, 104, as depicted in FIG. 1, the event correlation system 150 initially filters out irrelevant alerts and false positives based on a combination of rule sets and real-time information obtained from OT asset management systems. Alerts not previously filtered out are fused and aggregated to strip redundant content. The event correlation system 150 also combines events possessing similar or identical characteristics into graph-based meta-alerts. This aims to significantly reduce the number of events/alerts under further consideration, while preserving existing relationships and metadata. The correlation component then utilizes a combination of threat data along with user-defined patterns or threat intelligence to prune the meta-alert graph as a secondary round of false positive elimination, and enrich threat scenario information. New patterns extracted are relayed via the pattern recognizer for further classification, while the response generator may provide courses of actions for incident response.

In some implementations, output may be provided by the event correlation system 150 to another system (e.g., a security information and event management (STEM) system) and/or to a system operator as reporting/visualization data. For example, output from the event correlation system 150 may include pattern visualization data 160 that is representative of complex ICS cyber attacks. Based on the system output (e.g. pattern visualization data 160), for example, appropriate courses of action may be employed to counter ongoing and/or future attacks. In the present example, the information technology (IT) network domain 102, and the operational technology (OT) network domain 104 each has different characteristics (e.g., architecture, resources, protocols, and standards), and each domain may be susceptible to different security threats. Occasionally, correlations may not be detected among events/alerts within a single domain, (and if correlations are detected, an extent of an associated compromise may not be entirely known), but correlations may be detected among events/alerts across multiple domains. By correlating data from multiple domains, for example, complex attacks (e.g., multi-stage, multi-domain attacks executed over time) may be detected, and a single vantage point may be provided to security technicians.

The telemetry analytics system 130 is a machine learning based detection engine that incorporates operational telemetrics with domain-specific context to inform cyber security insights. The telemetry analytics system 130 includes an anomaly detection processing engine 132 and a root cause analysis processing engine 134. One or more sensors 170 (e.g., temperature sensors, flow sensors, pressure sensors, actuators, and other control system devices) are connected to and communicate with a PLC 172 within the OT network domain 104 monitor physical processes and generate streams of data which includes telemetry data 128. The telemetry data 128 is ingested by the telemetry analytics system 130 for further processing by the anomaly detection engine 132. Activity data 140b, which may include security log data, events, and alerts is also ingested by the telemetry analytics system 130 for further processing by the root cause analysis engine 134. The root cause analysis engine 134 may receive and process multiple types of data. Generally, three different types of data are processed by the root cause analysis engine 134, and include ICS security knowledge (e.g., 142 FIG. 3) (e.g., security policies, security data and knowledge from a domain expert); security device data (e.g., 144 FIG. 3) from network devices including firewalls, intrusion detection systems, and security device logs; and the processed output 146 from the anomaly detection processing engine 132 which is telemetry data 128 identified as being anomalous.

Unlike current off-the-shelf security appliances that work based on network and system data inspection, system 100 (e.g. an ESTATION system working in association with an industrial control system) will provide an edge controller-level situational awareness system that ingests telemetry data 128 from physical sensors and controllers into the anomaly detection engine 132 within the telemetry analytics system 130 (e.g., a SINOPTEC system). Depending on the type of data and inputs provided, physical process anomalies are detected using control model-based and/or machine learning data-driven approaches. The model-driven approaches will enable the detection of attacker spoofing of telemetry data. Upon detecting an anomaly, the telemetry analytics system 130 incorporates domain-knowledge using a Bayesian network method to label anomalies as cybersecurity attacks, human errors, process failures, or system faults, and then generates corresponding alerts that are further processed by the event correlation system 150. In one example, the domain-knowledge may be leveraged to assign weights to each of the anomalies labeled as cybersecurity attacks, human errors, or system faults.

The telemetry analytics system 130 is a process level anomaly detection system based on operational telemetrics and domain-specific knowledge that protects cyber physical system (CPS) devices against zero-day exploits not detectable through traditional system log or network packet inspection. The telemetry analytics system 130 operates as a security component comparable to intrusion detection or anti-virus/anti-malware that generates alerts upon detecting anomalies in the activity data (e.g. activity data 140b) ingested from system or network data sources. However, due to different characteristics of cyber-physical systems and recently analyzed ICS incidents (e.g., Stuxnet and Dragonfly), it is not necessarily possible to detect physical process anomalies only based on network/system logs and disregarding operational telemetrics (e.g. telemetry data 128). On the other hand, as currently used in ICS networks, telemetry data analysis based on process semantics can reveal anomalous behaviors (caused by human or system faults, process failures and/or cyber attacks) of CPS devices (e.g., PLCs and Smart Meters). As shown in FIG. 1, the telemetry analytics system 130 integrates with other security components in the OT network domain 104 to label anomalies as human errors, system faults, process failures or cyber-attacks that will be further processed and analyzed by modules within the event correlation system 150 to improve the situational awareness, for example, in power grids.

Figure 2:
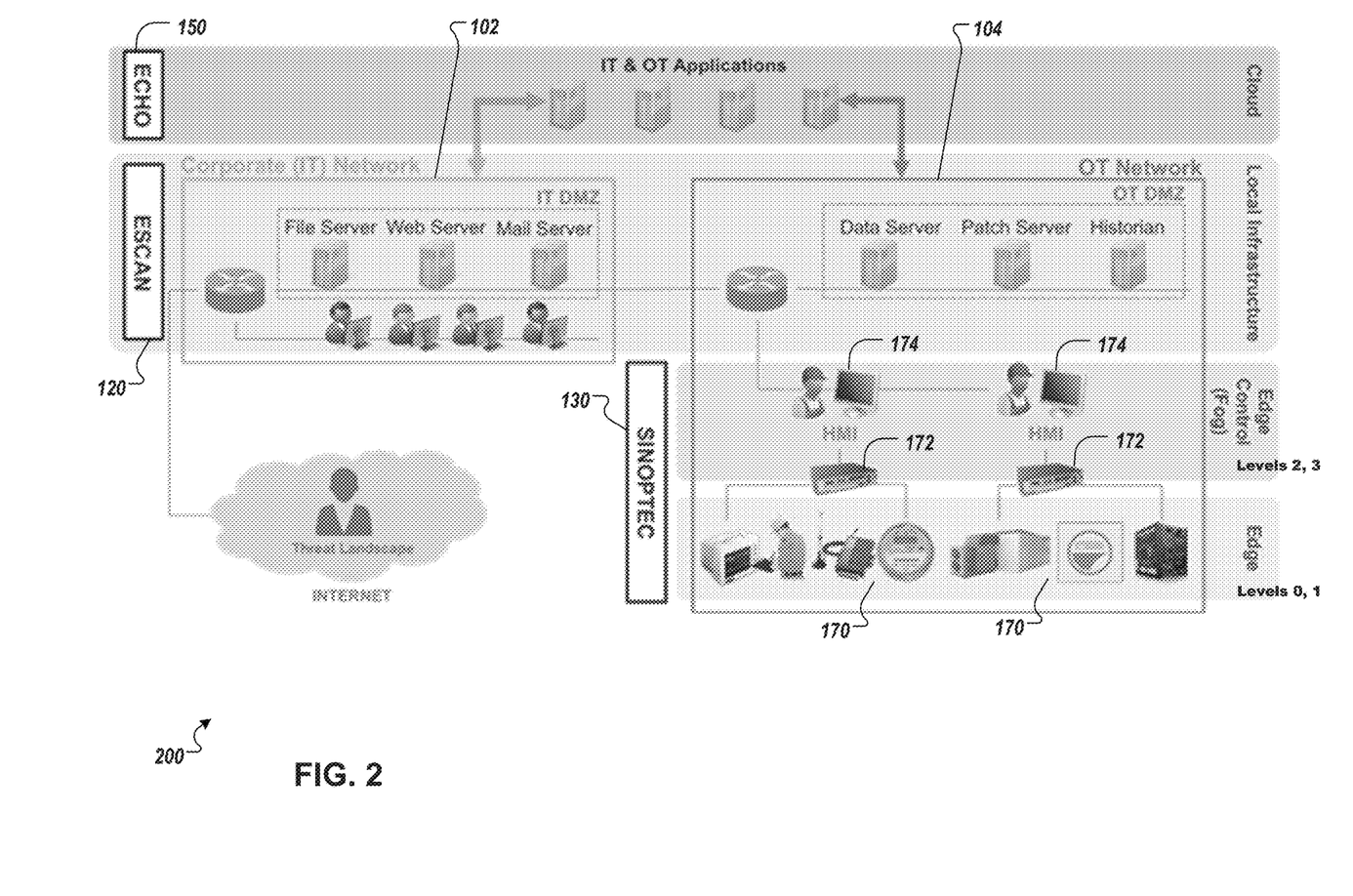
FIG. 2 is a diagram showing the components of the threat detection and identification system of FIG. 1 mapped over the levels of an Industrial Automation and Control Systems (IACS) security standard.

As shown in FIG. 2, an exemplary threat detection and identification system 200 (e.g., another implementation of an ESTATION system) considers multiple IACS zones for situational awareness in energy delivery systems and proposes a different module for each of them. At the very low level, the telemetry analytics system 130 (e.g., a SINOPTEC system as described in greater detail herein) focuses on anomaly detection in the control zone (i.e., levels 0, 1, and 2 in IACS standard) where edge devices (e.g., sensors 170, actuators 170, smart meters 170, and controllers 172) are controlled through control interfaces (e.g., one or more Human Machine Interfaces 174). FIG. 2 also shows that the telemetry analytics system 130 interfaces with Level 0 and Level 1 devices of an ICS network represented in system 200. The security controls assignment system 120, shown as the ESCAN processing system is a security management module for evaluating the effectiveness and efficiency of every security control deployed in both IT and OT domains 102, 104 of an ICS network. Thus, it is important to implement the security controls assignment system 120 in the administrator level responsible for asset inventory and management. A typical implementation of a multi-domain correlation system is also depicted in FIG. 2. The event correlation system 150, shown as the ECHO system receives activity data from security appliances (also known as security sensors) deployed in both IT and OT networks 102, 104. In order to ingest data from every network domain and to perform graph-based correlation and pattern extraction on the large amount of data, the event correlation system 150 may be implemented on cloud based processing system to take advantage of the scalability and agile delivery that it offers.

Figure 3:
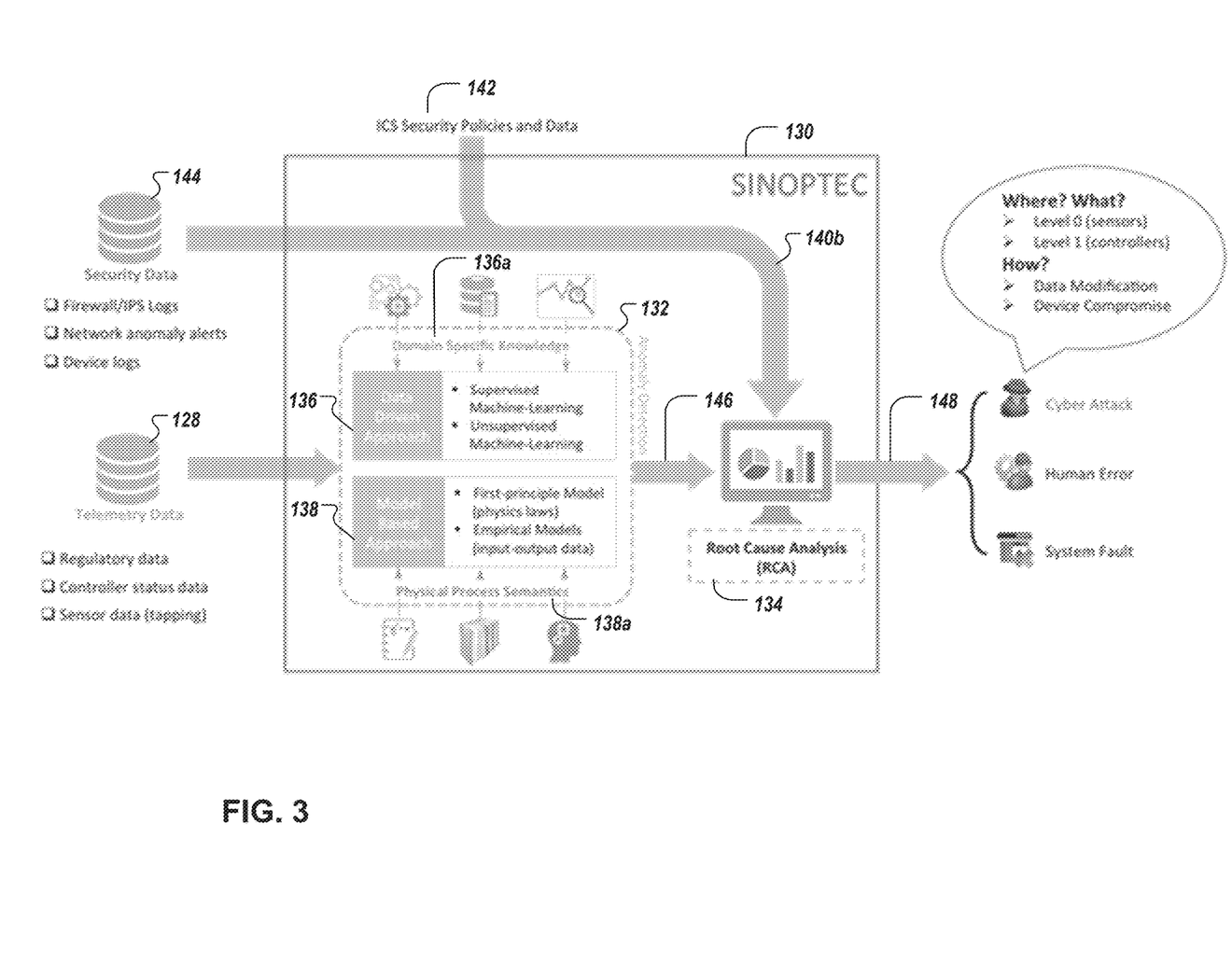
FIG. 3 is a diagram showing the components of the telemetry analytics system that forms a portion of the overall threat detection and identification system.

FIG. 3 shows additional technical features of the telemetry analytics system 130. More specifically, the features of the anomaly detection engine 132 are shown to include processing steps that implement data driven anomaly detection 136, and processing steps that implement model based anomaly detection 138. As part of the model based anomaly detection 138, physical process semantics data 138a is provided as an input to the anomaly detection process. In one example, physical process semantics data 138a may include information and data that is already known about the expected operation of a system. For example, if a system operates to maintain the water level in a storage tank at a particular level, but the water level is too low and the sensor indicates that the pump is not running (when in fact the pump is expected to be running to bring the water level up), an anomaly can be detected from the data. Further analysis can be performed to determine whether the pump is faulty or whether the sensor is faulty. Using the model based processing approach, first-principle models (e.g. physics laws) and empirical models (e.g. input-output relationship data) are utilized by the model based processing routines. However, in some applications, the quantity of data required to implement model based anomaly detection is so large that the model based processing approach is less desirable than data driven processing approach. As part of the data driven anomaly detection 136, domain specific knowledge 136a is provided as an input to the anomaly detection process. In one example, domain specific knowledge 136a may include behavioral attributes and contextual attributes of the entire industrial control system being monitored. Supervised machine learning and unsupervised machine learning processes are also implemented as part of the data driven anomaly detection 136 to further analyze the telemetry data 128 and detect anomalous data.

In the context of either the model based anomaly detection 138 or the data driven anomaly detection 136, an anomaly can be identified as one of two types. As the first type, the anomaly may be a one-time deviation, meaning that a monitored value is above or below a pre-defined threshold and that the magnitude of the deviation is enough to be considered an anomaly. This type of anomaly can be detected through a state-less anomaly detection mechanism which means at any given time Ti during the process monitoring time, if a single deviation occurs the event is considered as anomaly. As the second type, a series of deviations need to occur during a predetermined monitoring time to be considered an anomaly. It should be noted that defining the size of the predetermined monitoring window and the threshold number of eligible deviations is critical to enhancing the accuracy of this anomaly detection process. The process of analyzing a series of deviations is well suited for noisy environments when the probability of having out-of-range values is high due to system or human errors. In order to keep track of these anomalies, the system needs to be stateful and sometimes calculate the average overshot among all deviations.

A state-less anomaly detection approach is suitable for mission critical ICS environments that do not accept any risk even at the price of higher false positives. Such systems have high detection rates (and high false positive rates) that can be adjusted through the second phase; root cause analysis to find whether the anomaly is related to cyber security activities or machine/human errors.

Stateful systems are less conservative than state-less system and thus generate fewer false (positive) alarms. These systems label an event as an anomaly if the event occurs multiple times during a given time window and it is based on the historical changes in the physical process and not just one simple deviation. A series of deviations in a time window is considered an anomaly if: 1) number of deviated samples is greater than normal ones (majority function); 2) number of deviations is greater than a constant value (threshold function); 3) the mean value of all samples in the time window is a deviation (mean function).

The telemetry data 128 that is ingested by the anomaly detection engine 132 may include, for example, regulatory data, controller status data, and sensor data that is either obtained directly from one or more sensors 170 (e.g. end-point physical control devices), or from a controller device such as a PLC 172 that is connected to the sensors 170. The root cause analysis engine 134 receives output 146 from the anomaly detection engine 132 and further processes this data along with ICS security policies and data 142 from other devices within the ICS, and security data 144 (e.g. firewall and/or IPS logs, network anomaly alerts, and other network device logs).

In some implementations, the anomaly detection engine 132 operates to systematically: 1) detect cyber-attacks, 2) localize the attacks once detected, and 3) learn one or more patterns associated with the detected attacks. The anomaly detection engine 132 executes a detection process. In one exemplary implementation, the detection process is applied to a water distribution system (e.g. for a large municipality or city) and is designed based on an ensemble method that leverages the anomaly detection capabilities of self-organizing maps, support vector regression, and hidden Markov models. The process executes a variation of a divide-and-conquer method developed for the specifics of the anomaly detection engine 132. To enhance the anomaly detection process executed by the anomaly detection engine 132, the sensors relating to distinct systems can be grouped together into logical groupings. For example, sensors may be grouped together that relate to a particular system, particular zones within a larger system, or two or more different geographical systems within a larger system. In another example, all of the sensors and actuators connected to a single PLC may be grouped together and separate from the sensors and actuators connected to another PLC, even though both PLCs communicate within the same OT network domain.

In an initial step, the detection process partitions the entire industrial control network and original dataset into multiple smaller sub networks and datasets with high intra-class (and low inter-class) correlation. With reference to FIG. 3 this can be achieved by clustering the telemetry data 128 into datasets that correspond to the smaller sub networks. When applied to the water distribution system implementation, different geographically separate sections of the water distribution system may be organized into individual sub networks, because for example, the system for a first geographic section may operate independently from the system of a separate second geographic section. Thus, telemetry data produced by the sensors of the system for the first geographic section are clustered for further analysis, and telemetry data produced by the sensors of the system for the separate second geographic section are separately clustered for further analysis. In this manner, only data (e.g, telemetry data 128) for a particular sub network is analyzed to detect anomalies, and data for a different sub network that may have different associated behavior and anomalies will not influence the analysis for the particular sub network. This initial step allows an anomaly relating to an attack to be pinpointed more efficiently and accurately, because telemetry data that is properly clustered will allow the correlation process to identify anomalies more efficiently with a higher level of accuracy. In a next subsequent processing step, each sub network is inspected for cyber anomalies using the aforementioned detection techniques of self-organizing maps, support vector regression, and hidden Markov models to determine whether the anomaly relates to a cyber-attack. In a next subsequent processing step, each newly discovered attack is modeled as a set of rules such that future attacks can be identified faster. This processing step allows the intrusion detection engine 132 to adaptively evolve.

The telemetry analytics system 130 incorporates domain-specific context and knowledge (e.g., the particular control model of CPS devices; clustering telemetry data from geographically independent sections of a system into sub networks) with cyber security data for improving the security insight throughout the whole ICS network. One objective of the telemetry analytics system 130 is to use operational telemetry data to detect anomalous behaviors in sensors, such as endpoint physical control devices 170 (Level 0 and Level 1 in IACS architecture). The operational telemetry data helps OT security administrators to observe anomalous activities against CPS devices, e.g., data tampering or unauthorized configurations, that cyber security tools/devices have no visibility over them. In order to report a process control modification, the security mechanism requires access to the process-level activities of control devices (e.g., status, setpoints), which is currently missing in ICS situational awareness mechanisms.

The telemetry analytics system 130 is an OT-specific anomaly detection tool that can be used as a security awareness interface in human-machine interface for system administrators. FIG. 3 shows the logical architecture of the telemetry analytics system 130 where operational telemetrics 128, and security logs/alerts/policies 142, 144 from all other security controls in the OT network 104 are ingested as inputs, and the output 148 is a set of anomaly alerts labeled as process failure, human/system faults, or cyber attacks. The two main components in the telemetry analytics system 130 are the anomaly detection engine 132 and root cause analysis engine 134. The anomaly detection engine 132 is configured to detect any type of anomalous behavior by controllers through analyzing telemetry data sent by controllers 172 (e.g., PLC, smart meters) to HMI 174 and in some scenarios data sent from sensors 170 to controllers 172 (however, it should be noted that this is not always available in power grid unless tapping mechanism is implemented). Since most known OT-specific operations monitoring tools currently available in ICS networks perform anomaly detections for safety checks only, without identifying the root cause of the failure, a new approach in anomaly detection engine for OT environment is disclosed. Upon detecting anomalies (output 146), the root cause analysis (RCA) components within the root cause analysis engine 134 leverage other security logs/alerts/policies 142, 144 along with domain knowledge to identify the main cause of the anomalous behavior. The processes executed by the root cause analysis engine 134 identify the root cause of the detected anomaly, for example the source or reason, and further determines whether the root cause of the detected anomaly is likely associated with a cyber-attack. Thus, the output 148 of the root cause analysis engine 134 provides additional context to identify the source of the detected anomaly by labeling each anomaly as a system fault, process failure, human error, or cyber attack. The root cause analysis engine 134 is particularly valuable for analyzing ICS systems that implement a stateless approach, and ICS systems that include multiple zones.

The operations and processes of the telemetry analytics system 130 are further described with reference to FIG. 3. Depending on the OT architecture (e.g., being able to perform tapping on sensor-controller communication links), type of controllers, and the volume of telemetry data, different approaches of anomaly detection for security insight are disclosed and include: 1) a model based approach (138) that assumes the control model of a monitored controller 172 (e.g., a PLC) is available and the monitoring mechanism has access to both input data to the controller 172 as well as the controller's response; 2) a data driven approach (136) that is used for scenarios where control models are not available (or very complex to analyze) or/and there is no direct access to sensor data sent to the controller (i.e., input data). In the latter data driven approach, depending on the data provided for the monitoring mechanism, the anomaly detection engine 130 can execute supervised or unsupervised machine learning processes and techniques for data clustering and anomaly detection in the controller's behavior. When anomalies are detected (146), the root cause analysis engine 134 is triggered to trace down the main cause of the anomaly, and determine as output 148 whether the anomaly is a system fault, process failure, human error, or cyber attack. The telemetry analytics system 130 may also implement graph-theory based or Bayesian network approaches to incorporate domain knowledge with telemetry data for root cause analysis. The root cause analysis engine 134, as shown in FIG. 3, benefits from OT-specific security data 142, 144, such as firewall/IDS alerts, HMI logs, and any other security alert generated by security controls deployed in the OT domain (as explained in ESCAN).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers, A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 4:
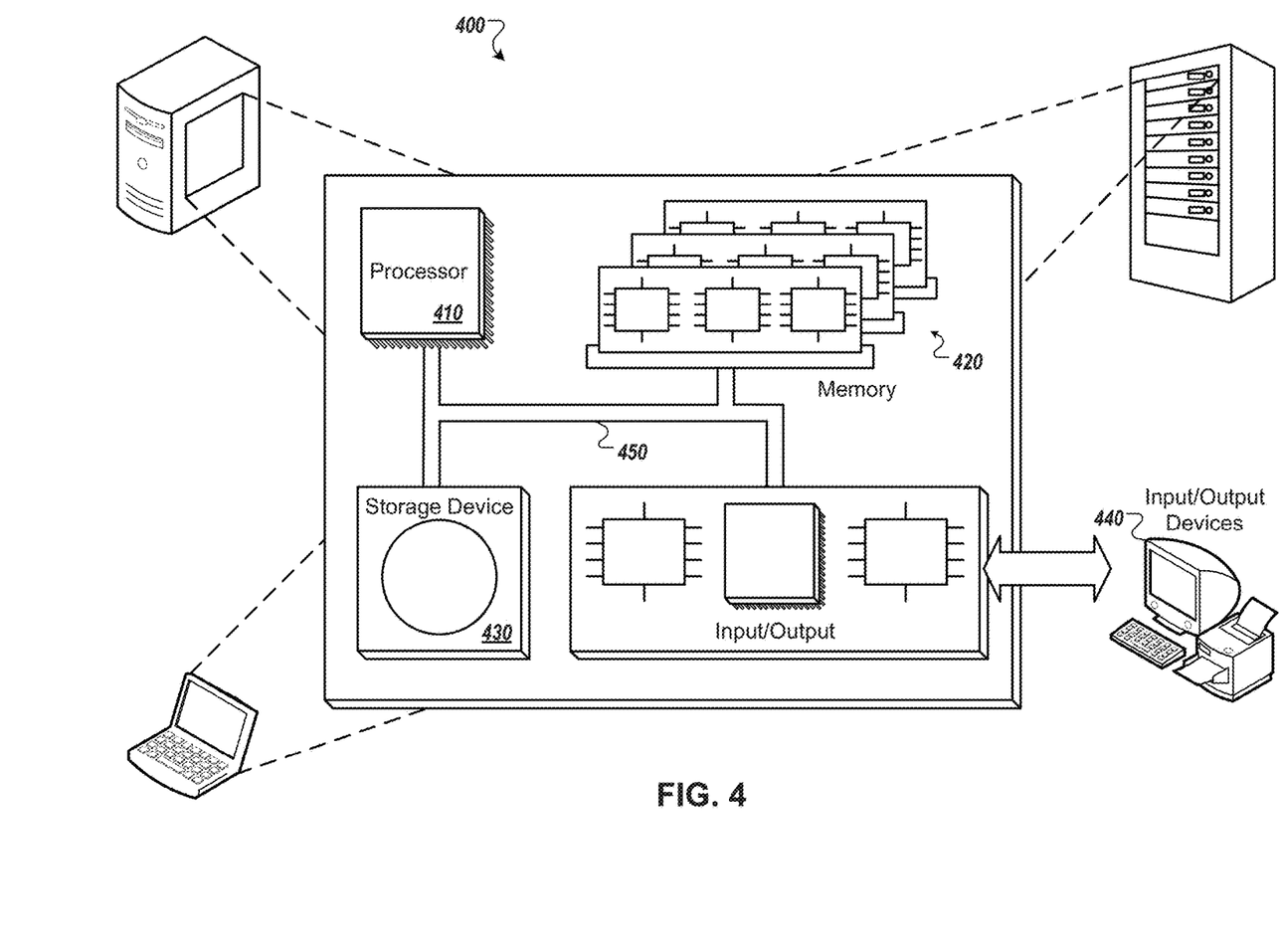
FIG. 4 is a diagram of a computing system that can be used in connection with computer-implemented methods described in this document.

An example of one such type of computer is shown in FIG. 4, which shows a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A security system for detecting a security anomaly associated with a physical process within an industrial control system (ICS) comprising:
    an industrial control network including a plurality of endpoint devices, and at least one programmable logic controller that communicates with the endpoint devices through the industrial control network, the endpoint devices producing telemetry data and transmitting the telemetry data on the industrial control network; and
    a telemetry analytics engine server configured to:
        receive the telemetry data from the endpoint devices and cluster the telemetry data into logical endpoint device groupings according to a location of each logical endpoint device in the industrial control network, each grouping representing a sub network of the industrial control network that corresponds to a different separate section of the industrial control network, and
        receive security data from at least one external data source, the security data being based on one or more of device log data, network log data, or security alert data;
    the telemetry analytics engine server further comprising:
        an anomaly detection processor configured to analyze the clustered telemetry data to detect anomalies that indicate a potential security compromise;
        a root cause analysis processor configured to execute a correlation process between the security data received from the at least one external data source, and data that is output from the anomaly detection processor;
    the telemetry analytics engine server identifying the root cause of the potential security compromise with respect to the industrial control system and providing an anomaly alert to a human machine interface (HMI).

2. The system of claim 1, wherein the endpoint devices are one or more sensors that monitor the physical process.

3. The system of claim 1 further comprising an event correlation system comprising one or more computers and that receives the anomaly alert from the telemetry analytics engine server.

4. The system of claim 1 wherein the anomaly detection processor executes a model based anomaly detection process to identify anomalies in the telemetry data.

5. The system of claim 4 wherein physical process semantics data is provided as an input to the model based anomaly detection process, the physical process semantics data including data that relates to expected operation of the industrial control network.

6. The system of claim 1 wherein the anomaly detection processor executes a data driven anomaly detection process that executes one or more machine learning processes to identify anomalies in the telemetry data.

7. The system of claim 6 wherein domain specific knowledge is provided as an input to the data driven anomaly detection process the domain specific knowledge including behavioral attributes and contextual attributes of the industrial control network.

8. The system of claim 1 wherein the correlation process executed by the root cause analysis engine determines whether the root cause of the anomaly is one of a cyber-attack, a human error, a process failure, or a system fault.

9. The system of claim 1 wherein the anomaly detection processor uses a stateless anomaly detection mechanism to identify an anomaly as a one-time deviation, based on a monitored value in the clustered telemetry data being above or below a threshold value.

10. The system of claim 1 wherein the anomaly detection processor uses a stateful anomaly detection mechanism to identify an anomaly based on a series of deviations that have occurred during a predetermined monitoring time window.

11. The system of claim 10 wherein the anomaly detection processor identifies the anomaly based on the series of deviations including a number of deviated samples that is greater than a number of normal samples.

12. The system of claim 10 wherein the anomaly detection processor identifies the anomaly based on the series of deviations including a number of deviated samples that is greater than a threshold value.

13. The system of claim 10 wherein the anomaly detection processor identifies the anomaly based on a mean sample value of the series of deviations.

\* \* \* \* \*

UNITED STATES PATENT AND TRADEMARK OFFICE
CERTIFICATE OF CORRECTION

PATENT NO.         : 10,148,686 B2
APPLICATION NO.    : 15/429900
DATED              : December 4, 2018
INVENTOR(S)        : Amin Hassanzadeh et al.

It is certified that error appears in the above-identified patent and that said Letters Patent is hereby corrected as shown below:

In the Claims

In Claim 7, Column 16, Line 59, delete "process" and insert --process,--, therefor.

Signed and Sealed this
Twenty-second Day of January, 2019

Andrei Iancu
*Director of the United States Patent and Trademark Office*